Oct. 29, 1968 R. J. LINDEMAN 3,408,520
TEMPERATURE RESPONSIVE MEANS FOR MOVING THE YOKE OF A COLOR
TELEVISION RECEIVER TO COMPENSATE FOR BEAM
LANDING ERROR DURING TUBE WARMUP
Filed Nov. 1, 1966

INVENTOR
RICHARD J. LINDEMAN
BY Mueller, Aichele & Rauner
ATTORNEYS.

United States Patent Office 3,408,520
Patented Oct. 29, 1968

3,408,520

TEMPERATURE RESPONSIVE MEANS FOR MOVING THE YOKE OF A COLOR TELEVISION RECEIVER TO COMPENSATE FOR BEAM LANDING ERROR DURING TUBE WARMUP

Richard J. Lindeman, Elmwood Park, Ill., assignor to Motorola, Inc., Franklin Park, Ill., a corporation of Illinois Filed Nov. 1, 1966, Ser. No. 591,244
5 Claims. (Cl. 313—75)

ABSTRACT OF THE DISCLOSURE

A color television deflection yoke is movably mounted within a fixed yoke support. Bimetallic strips are coupled between the fixed yoke support and the movable yoke. The change in temperature within the television receiver during tube warmup is sensed by the bimetallic strips, which react to move the deflection yoke along the tube neck within the yoke mounting to compensate for beam landing errors induced by shadow mask expansion.

This invention pertains to apparatus for correcting beam landing errors in a cathode ray tube of a color television receiver caused by the expansion of the shadow mask screen during tube warmup.

In a typical color television receiver, the viewing screen is composed of a plurality of triads of phosphor dots, and the beams from three electron guns are scanned across the screen through holes in a shadow mask assembly. The holes are aligned with the dots so that the beams each impinge on a respective dot of the triad so that it produces its characteristic color. Alignment of the electron guns with the holes in the shadow mask and with the respective phosphor dots is critical. For instance, during the period of picture tube warmup subsequent to energizing the receiver, the temperature elevation in the receiver causes expansion of the metal shadow mask causing misalignment of the holes in the shadow mask with the associated phosphor dots on the viewing screen. This misalignment introduces beam landing error and degrades the color quality of the picture presentation.

It is an object of this invention to provide apparatus for correcting beam landing errors in a color television receiver caused by shadow mask expansion during picture tube warmup.

It is another object of this invention to provide apparatus for correcting beam landing errors in color television receivers caused by shadow mask expansion during tube warmup that is simple and therefore relatively inexpensive to manufacture.

In one embodiment of this invention, a shadow mask assembly is positioned between the electron guns and the viewing screen portion of a cathode ray tube used in a color television receiver. A yoke mounting fixed to the tube receives a deflection yoke, which is free to move within the mounting along the neck of the tube. The yoke establishes a magnetic field having a deflection center for scanning the electron beams through the shadow mask and over the viewing screen portion of the tube. Bimetallic strips are coupled between the fixed yoke support and the movable yoke. Subsequent to energizing the receiver, during tube warmup, the temperature of the tube elevates causing the shadow mask to expand. The expansion of the shadow mask causes misalignment of the holes in the mask with the respective phosphor dots on the viewing screen introducing beam landing error. The temperature rise, however, is sensed by the bimetallic strips which change dimensions moving the deflection yoke along the tube neck within the yoke mounting. This movement of the yoke varies the deflection center of the electron beams to increase the breadth of the scan of the beam in proportion to the expansion of the shadow mask screen so that the beam is adjusted to pass through the shifted holes and strike the associated phosphor dots at the proper angle for maximum color brightness.

Figures 1, 2, 3, 4:
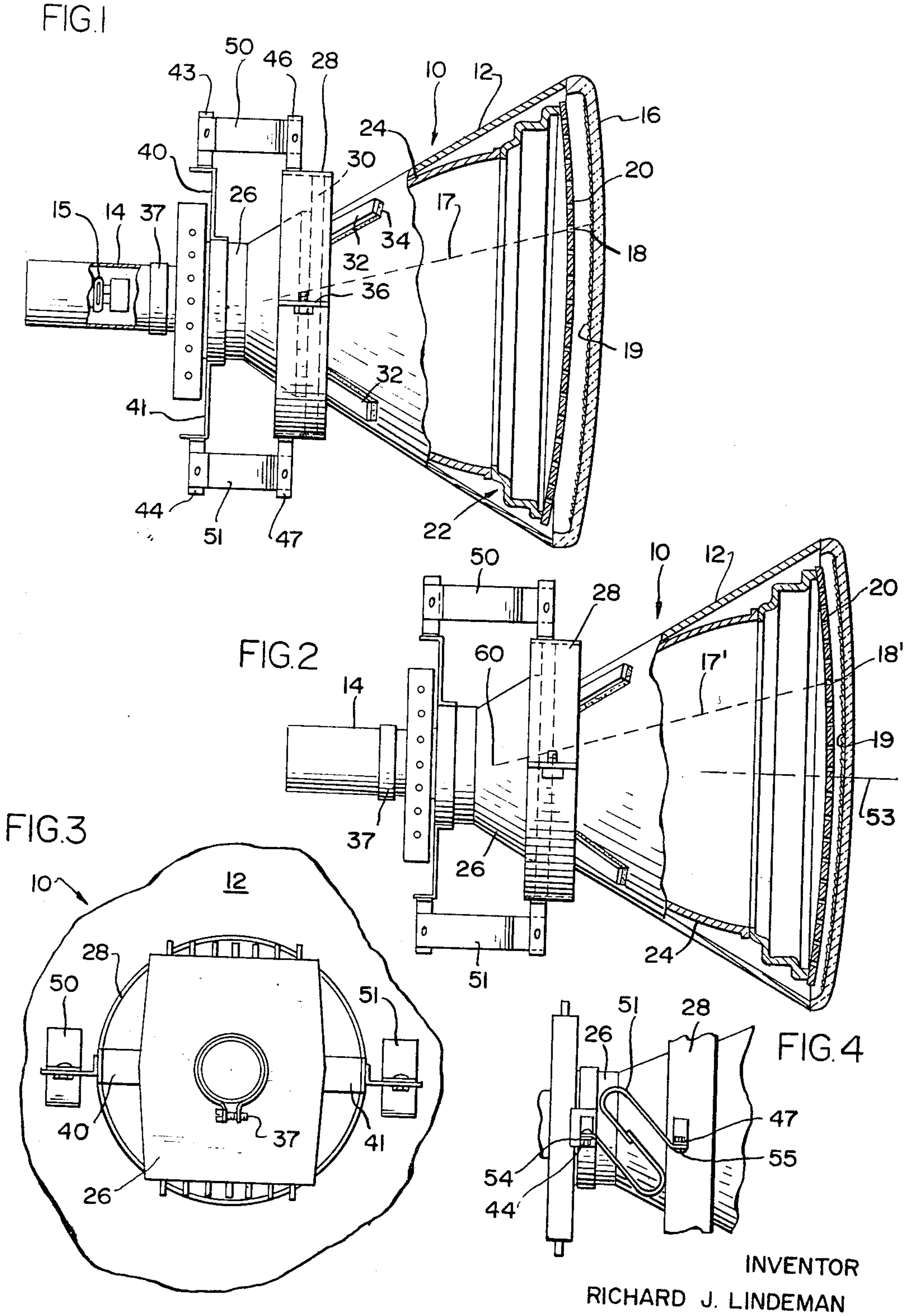
FIG. 1 is a top plan view partially in cross-section of the apparatus for correcting beam landing errors caused by shadow mask expansion in accordance with the principles of this invention.
FIG. 2 is a top plan view similar to FIG. 1 showing the shadow mask in an expanded position.
FIG. 3 is a rear elevation view of the apparatus shown in FIG. 1.
FIG. 4 is a side elevation view of a portion of the apparatus of FIG. 1.

Bimetallic strip as used in this application is a strip having two different metals intimately joined together, wherein the metal forming the top of the strip has a different coefficient of thermal expansion than the metal forming the bottom of the strip. When subjected to temperature changes, the bimetallic strip flexes because of the different coefficients of thermal expansion of the two different materials making up the strip.

Referring to the drawings, FIG. 1 shows a shadow mask type cathode ray tube 10 having a funnel or bell shaped portion 12 and a neck portion 14 which could be used in a color television receiver. Attached to the funnel 12 is a front panel or viewing screen portion 16. The front panel 16 and the funnel 12 cooperate to form a sealed envelope. Electron beams travel from three guns 15 that are mounted in the neck portion 14 of the tube 10. During scanning of the viewing screen 16, these beams travel through holes in the shadow mask screen 20 of the shadow mask assembly 22 that is secured to the sides of the front panel 16. One such beam is shown at 17 and passes through the hole 18. The holes in the screen 20 of the shadow mask assembly are aligned with triads of phosphor dots 19 on the front panel of the viewing screen portion 16 so that each of the beams from the electron guns impinge a respective dot of the triad at the desired angle to produce its characteristic color. Accuracy of the beam landing on the screen 16 is critical. For instance, if the holes of the shadow mask screen 20 become misaligned with the associated phosphor dots on the viewing screen beam landing errors are introduced which degrade the color quality of the picture presentation.

Attached to the shadow mask assembly 22 is a shield 24 formed from a thin metallic sheet. The shield acts to reduce X-ray radiation from the shadow mask assembly, eliminates illumination of the viewing screen by overscanned electrons and reduces the effect of stray magnetic fields to cause shifting of the electron beams.

A deflection yoke 26 is mounted to the neck 14 of tube 10 by the yoke mounting device or ring 28. The yoke 26 has an annular portion 30 which is fitted inside the ring 28 and coaxial therewith and establishes a magnetic field for deflecting the electron beams. A plurality of fingers 32 are integral with the ring 28 and extend therefrom at an angle which is substantially equal to the angle of taper of the bell-shaped portion 12 of the tube 10. A two sided adhesive tape 34 is mounted on one side of the fingers 32 and is used to adhere or glue the fingers 32 to the surface of the bell portion 12 of the tube 10. This fixes the mounting device 28 in a given position with respect to the tube. A clamp 36 is used to tighten the ring 28 about the annular portion 30 of the yoke 26. The ring 28 therefore movably receives the yoke 26 and acts as a jig to position the yoke so it is concentric with the neck 14 of the tube. A clamp 37 (FIG. 3) fits around the yoke and is used to slidably clamp the yoke 26 to the neck 14 of the tube.

Extending from the yoke 26 are brackets 40 and 41 and fastened to each bracket 40 and 41 are foot portions 43 and 44 respectively. Likewise extending from the yoke mounting device 28 are foot portions 46 and 47. Coupled between these foot portions are bimetallic strips 50 and 51. As shown in FIG. 4, the bimetallic strips are folded back upon themselves in an accordion-like manner. These strips are each cut, reversed with respect to each other and welded as shown so that after they are folded, the change in dimension of the strip due to temperature change will develop straight line motion. The ends of the strips are fastened such as by screwing or welding, to the foot portions 43 and 46 and 44 and 47 thereby coupling the movable yoke 26 to the fixed yoke support 28. Also as shown in FIG. 4, the ends 54 and 55 of the strip 51 are fastened to the foot portions 47 and 44 which extend substantially the same distance from the yoke 26 and yoke support 28 so that they both lie in the same horizontal plane. Therefore for any longitudinal change in dimension of the bimetallic strip 51, a force will be applied in the plane containing the two ends of strip 51. Of course, the same is true for the ends of strip 50.

The bimetallic strips 50 and 51 cooperate with the movable yoke 26 and fixed yoke support 28 to compensate for beam landing error during tube warmup. In operation, when the television receiver is energized, the metal of the shadow mask screen is bombarded by electrons causing it to become heated. This heat plus an increase in the ambient temperatures surrounding the tube causes the metal shadow mask 20 to expand. As the shadow mask expands, it causes a misalignment of the apertures of the shadow mask assembly with the associated phosphor dots on the viewing screen. The bimetallic strips, however, sense the change in the ambient temperatures of the receiver brought about by tube warmup and, as the temperature increases, the strips 50 and 51 expand longitudinally causing a force to be applied in the plane containing the ends of the bimetallic strips and the foot portions 43, 44 and 46, 47 mounted to the yoke brackets 40, 41 and yoke mounting ring 28, respectively. Because the yoke support 28 is fixed to the bell portion 12 of the tube 10, the ends of the bimetallic strips connected to the yoke support cannot move. However, since the yoke 26 is free to slide within the ring 28 the expansion of the strips acts on the yoke 26 to slide it longitudinally along the neck 14 of tube 10 and within the ring 28 as shown in FIG. 2. This effectively changes the position of the magnetic field of the yoke 26, and hence the center of deflection 60 of the electron beams by moving it towards the rear of the tube generally along the tube longitudinal axis, which substantially coincides with the yoke center line 53.

The effect of the movement of the deflection center of the yoke on the electron beams may be seen by referring to FIG. 2. By moving the yoke 26 rearwardly the center of deflection 60 is changed so that the electrons are deflected sooner. FIG. 1 represents the tube before warmup and the beam 17, which represents one of the three electron beams, passes through hole 18 in the shadow mask screen 20 where it strikes the associated phosphor dot of the triad at the optimum angle. In FIG. 2, which represents some period after the beginning of tube warmup, the shadow mask has expanded. In a properly designed tube the expansion of the mask can be made to be radial about a point which is on a line through the center line of the deflection yoke 26 such as line 53. The hole 18′ is therefore shown (somewhat exaggerated) to have moved radially outwardly with respect to the center line 53. Therefore, if the deflection center of the yoke's magnetic field is not moved beam 17 will obviously not pass through hole 18 at the desired angle and a beam landing error will be introduced. By moving the yoke and associated magnetic field rearwardly, however, the deflection center 60 is so changed that the breadth of the scan is increased so that electron beam 17′ now passes through the shifted hole 18′ to strike the associated phosphor dot of the triad at the proper angle.

In one test of this device it was found that the deflection yoke moved rearwardly ⅛ of an inch to compensate for a 3 mil expansion of the shadow mask screen due to a 40° C. elevation in mask temperature.

The bimetal is chosen so that the movement of the yoke along the neck of the tube to shift the deflection center of the electron beams will be directly proportional to the amount of expansion of the shadow mask screen 20. The yoke will be gradually moved during the time that the shadow mask screen 20 is actually expanding during tube warmup.

It is important to note that it is necessary to the operation of this invention to move the deflection center to vary the breadth of the scan of the electron beams in response to the changing dimensions of the shadow mask screen because of temperature changes. This could, of course, be effected in ways other than by using bimetallic strips to move the yoke. For instance, once the expansion characteristic of the shadow mask was determined an electric motor driving a cam could physically move the yoke back along the neck of the tube a sufficient amount during the time that the shadow mask screen is expanding to compensate for the expansion. Another approach could be to vary the length of the magnetic field to cause a change in the center of deflection.

This invention by shifting the center of deflection of the electron beam to compensate for shadow mask expansion could permit an increased electron beam usage of the phosphor dots of the triad thereby increasing the brightness of the picture presentation.

What has been described, therefore, is an unique apparatus for correcting beam landing errors in a color television receiver caused by shadow mask expansion during the tube warmup.

I claim:

1. In a color television receiver, a cathode ray tube including a funnel portion and a viewing screen portion cooperating to form a sealed envelope, a beam source of electrons mounted in the neck of the funnel portion and a shadow mask screen mounted between the source of electrons and the viewing screen, the combination including, a deflection yoke for establishing a magnetic field having a deflection center for scanning the electron beam across the viewing screen portion, a yoke support fixed with respect to the tube for movably receiving said yoke and supporting the same about the neck of the tube, and temperature responsive actuating means coupled to said yoke for moving the same within said yoke support and along the neck of the tube to vary the deflection center of the electron beam to compensate for the change in dimensions of the shadow mask screen due to changing temperatures within the receiver.

2. The color television receiver of claim 1 wherein the time said actuating means moves the yoke along the neck of the tube to vary the deflection center of the electron beam is substantially equal to the time of shadow mask expansion during tube warmup.

3. Apparatus for compensating beam landing errors caused by warmup in a color cathode ray tube having a funnel portion and a front panel portion cooperating to form a sealed envelope, a beam source of electrons mounted in the envelope and a shadow mask screen mounted between the beam source of electrons and the front panel portion, the apparatus including in combination, a deflection yoke for establishing a magnetic field having a deflection center for scanning the electron beam across the front panel portion, a yoke support fixed with respect to the tube for movably receiving said yoke and supporting the same about the neck of the tube, and temperature responsive means coupled to said yoke for moving the same within said yoke support and with respect to the tube to vary the deflection center of the electron beam substantially along the longitudinal axis of the tube to change the breadth of the scan of the beam to compensate for the expansion of the shadow mask screen due to temperature rise during tube warmup.

4. The apparatus for compensating beam landing errors in a color cathode ray tube of claim 3 wherein said temperature responsive means include a bimetallic strip connected between the fixed yoke support and the movable yoke so that said bimetallic strip senses the receiver temperature change with an increase in temperature during tube warmup and reacts to move the yoke within the yoke support proportional to the temperature change to vary the deflection center of the electron beam along the longitudinal axis of the tube to increase the breadth of the scan of the beam thereby compensating for the expansion of the shadow mask screen.

5. In a color television receiver the combination including, a cathode ray tube having a funnel portion and a front panel portion cooperating to form a sealed envelope, a plurality of electron guns mounted in the funnel portion, a shadow mask screen mounted between said electron guns and said front panel, a deflection yoke having an annular portion, said yoke establishing a magnetic field having a deflection center for scanning the electron beams from said guns across the viewing screen, a ring shaped yoke support fixedly mounted to the funnel portion of the tube, said annular portion of said deflection yoke being slidably mounted in said ring shaped yoke support concentric with the neck of the funnel portion of the tube and movable therealong, a plurality of bimetallic strips each folded back upon themselves, means connecting one end of the strips to said fixed yoke support and the other end to said movable deflection yoke, the ends of each said strip lying in the same plane, said bimetallic strips reacting to the change of temperature of the television receiver to change dimensions thereby applying a straight line force on said yoke and moving the same within said ring shaped yoke support and along the tube neck to vary the deflection center of the electron beams to increase the breadth of the scan of the beams thereby reducing beam landing error by compensating for the expansion of said shadow mask screen caused by receiver temperature elevation during the tube warmup.

References Cited

UNITED STATES PATENTS 3,330,979 7/1967 Constantine ---------- 313—75

JAMES W. LAWRENCE, *Primary Examiner.*

V. LAFRANCHI, *Assistant Examiner.*